HIGH FREQUENCY TRACK CIRCUITS FOR RAILROADS

Filed March 29, 1965 5 Sheets-Sheet 1

INVENTOR.
S.REICH
BY Forest B. Hitchcock
HIS ATTORNEY

Aug. 29, 1967 S. REICH 3,339,067

HIGH FREQUENCY TRACK CIRCUITS FOR RAILROADS

Filed March 29, 1965 5 Sheets-Sheet 2

INVENTOR.
S. REICH
BY Forest B. Hitchcock
HIS ATTORNEY

HIGH FREQUENCY TRACK CIRCUITS FOR RAILROADS

Filed March 29, 1965

5 Sheets-Sheet 3

INVENTOR.
S. REICH
BY Forest B. Hitchcock
HIS ATTORNEY

HIGH FREQUENCY TRACK CIRCUITS FOR RAILROADS

Filed March 29, 1965 5 Sheets-Sheet 4

INVENTOR.
S. REICH
BY
Forest B. Hitchcock
HIS ATTORNEY

INVENTOR.
S. REICH
BY Forest B. Hitchcock
HIS ATTORNEY

United States Patent Office 3,339,067

Patented Aug. 29, 1967

3,339,067
HIGH FREQUENCY TRACK CIRCUITS FOR RAILROADS

Simon Reich, Rochester, N.Y., assignor to The General Signal Corporation, Rochester, N.Y., a corporation of New York Filed Mar. 29, 1965, Ser. No. 443,460
8 Claims. (Cl. 246—34)

Figure 1A:
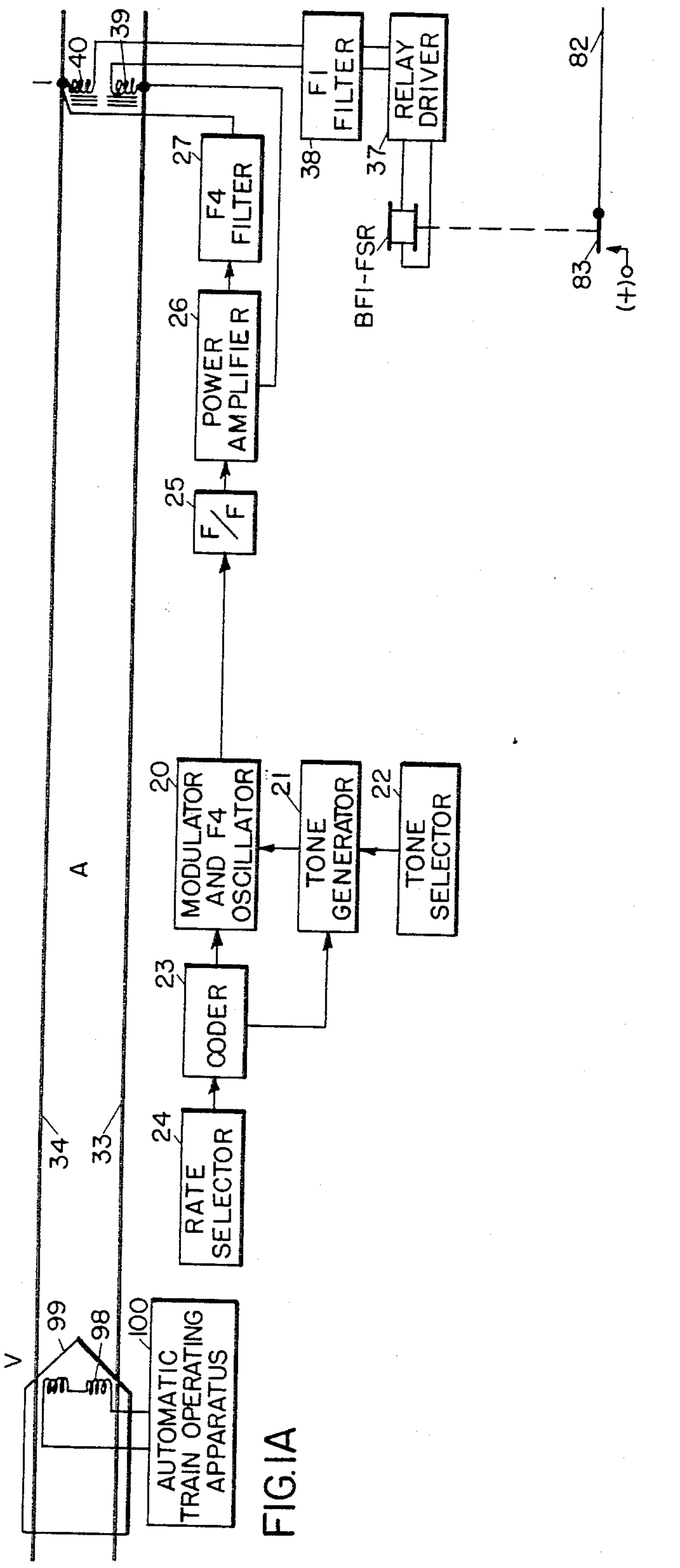

This invention relates to high frequency track circuits for railroads, and it more particularly pertains to high frequency track circuit systems that can be used for automatic train operation purposes.

A stretch of track that is constructed particularly for the passage of passenger trains may be constructed of continuous rail to provide for smoother train operation. It is therefore desirable to use track circuits that do not require insulated rail joints. Such a stretch of track can have a number of spaced track feed locations at which the track rails can be energized. The distance between the locations can be equivalent to the braking distance of a train at its maximum permitted speed for that section. First and second distinctive channel frequencies, for example, can be alternately applied at the respective locations so that the reception by suitable receiving apparatus on a vehicle of both frequencies at the same time, indicates that the stretch of track is clear for at least a predetermined distance in advance. Where the same frequency is applied at different feed points in a stretch of continuous rail trackway, one of the problems involved is that the track circuit energy used for the control of a vehicle may be distorted due to the reception of the same frequency energy from two different sources that are out of synchronism.

The system according to the present invention solves this problem by the application of track feed energy at the respective track feed locations to the track rails by approach control of a vehicle. By such approach control, feed energy is applied at only the next two locations in advance of the vehicle. This system permits the use of the same channel frequency at alternate locations, but yet provides that the same channel frequency will not be applied contemporaneously at a plurality of locations in advance of the vehicle.

It is necessary to be able to communicate a large number of distinctive controls from the wayside to a vehicle for automatic vehicle operation, and therefore a relatively high channel frequency must be used for communication to the vehicle in order to have sufficient band width for distinctive frequency modulation by different selected code combinations of a plurality of different tones. It is therefore desirable to apply a relatively high channel frequency to the track rails at the first location in advance of an approaching vehicle, modulated in accordance with selected tones to designate the desired controls for the vehicle. A lower channel frequency is transmitted at the second location in advance of a vehicle to prove that the trackway is clear at least to that second location. The present invention thus provides, according to one embodiment, that the feed locations are braking distance apart for the maximum speed of a vehicle in the section between feed points, and different channel frequencies are used, when rendered effective, for energization of the track rails at alternate locations. In addition, another channel frequency, modulated with control tones, can be transmitted by the first location in advance of a vehicle. Transmitters at the feed points are approach controlled so that energy is applied to the track rails only at the next two locations in advance of a vehicle. Approach coding of the tone modulated channel frequency guarantees that a particular speed limit will be a command in each block.

Thus oscillators are provided at each location for generating two distinctive channel frequencies, but these frequencies are never applied to the track rails simultaneously. As a check on the integrity of the system, and to prevent the accidental application of both frequencies simultaneously, the output of either of the oscillators that may be selected for transmission is used to drive a flip-flop circuit, the output of which governs the energization of the track rails at the associated location. A further check on the integrity of the transmission is made by coding all channel frequencies transmitted at a relatively slow rate, which can be selected in accordance with the direction of traffic.

An object of the present invention is to apply outputs of a plurality of frequency generators or oscillators selectively, one at a time, as inputs to a flip-flop circuit, and to apply an output of the flip-flop circuit to the track rails for track circuit energization.

Another object of the present invention is to further check the integrity of a signal for transmission to an approaching vehicle from the wayside by coding signals generated by the oscillators and applying the coded signals respectively through a single flip-flop circuit to the track rails.

Another object of the present invention is to code one of the channel frequencies by shifting the frequency of the oscillator generating such frequency to alternating higher and lower shift frequencies at a predetermined rate.

Another object of the present invention is to selectively energize the track rails at each location in accordance with the output of one or the other of oscillators operating at two different channel frequencies through a common flip-flop circuit and through a filter selected in accordance with the oscillator that has been selected.

Another object of the present invention is to approach control the application of selected channel frequency energy to the track rails of a continuous rail stretch of track in accordance with the approach of a vehicle.

Other objects, purposes and characteristic features of the present invention will be in part obvious from the accompanying drawings, and in part pointed out as the description of the invention progresses.

Figure 1B:
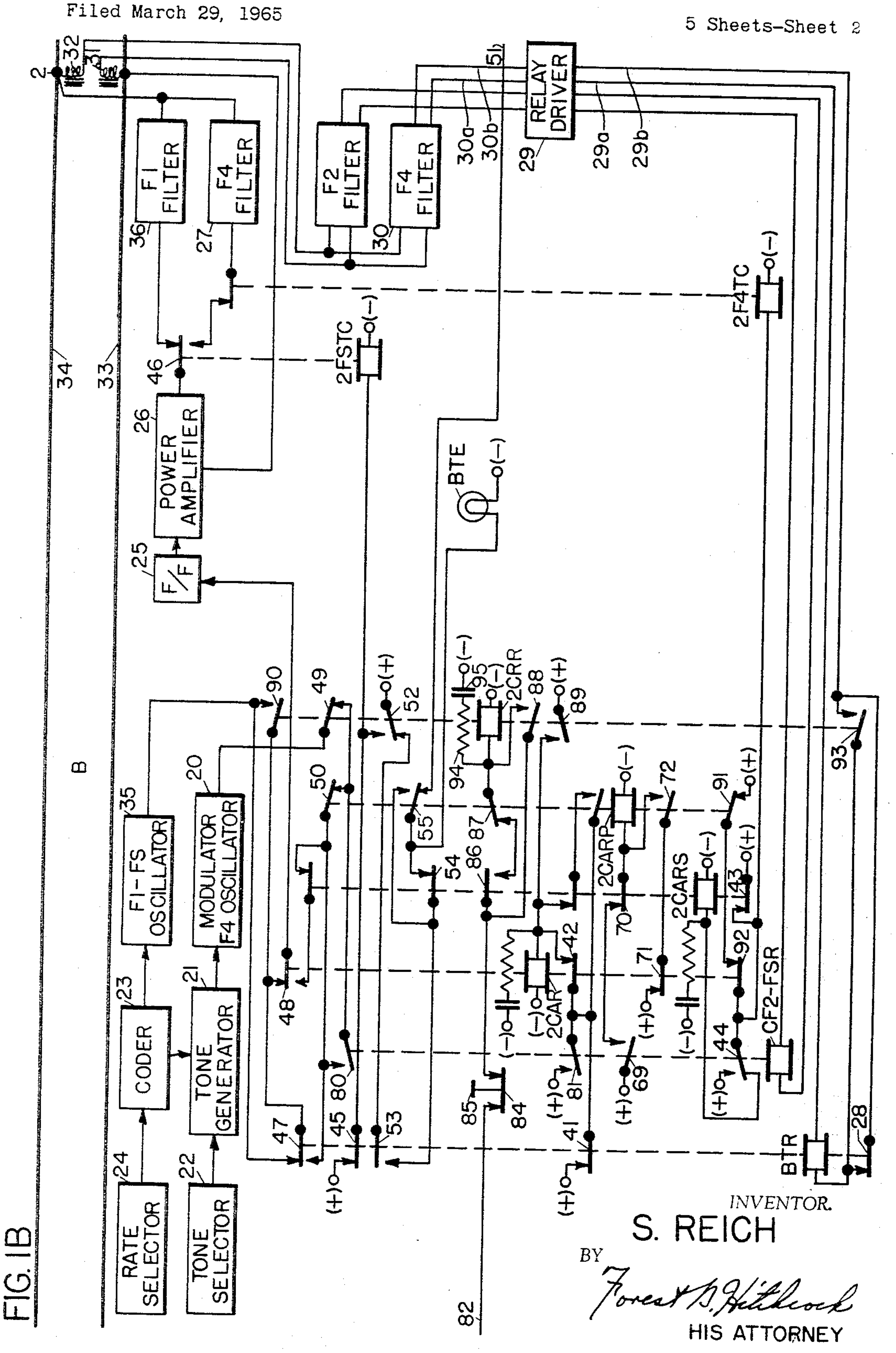
Figure 1C:
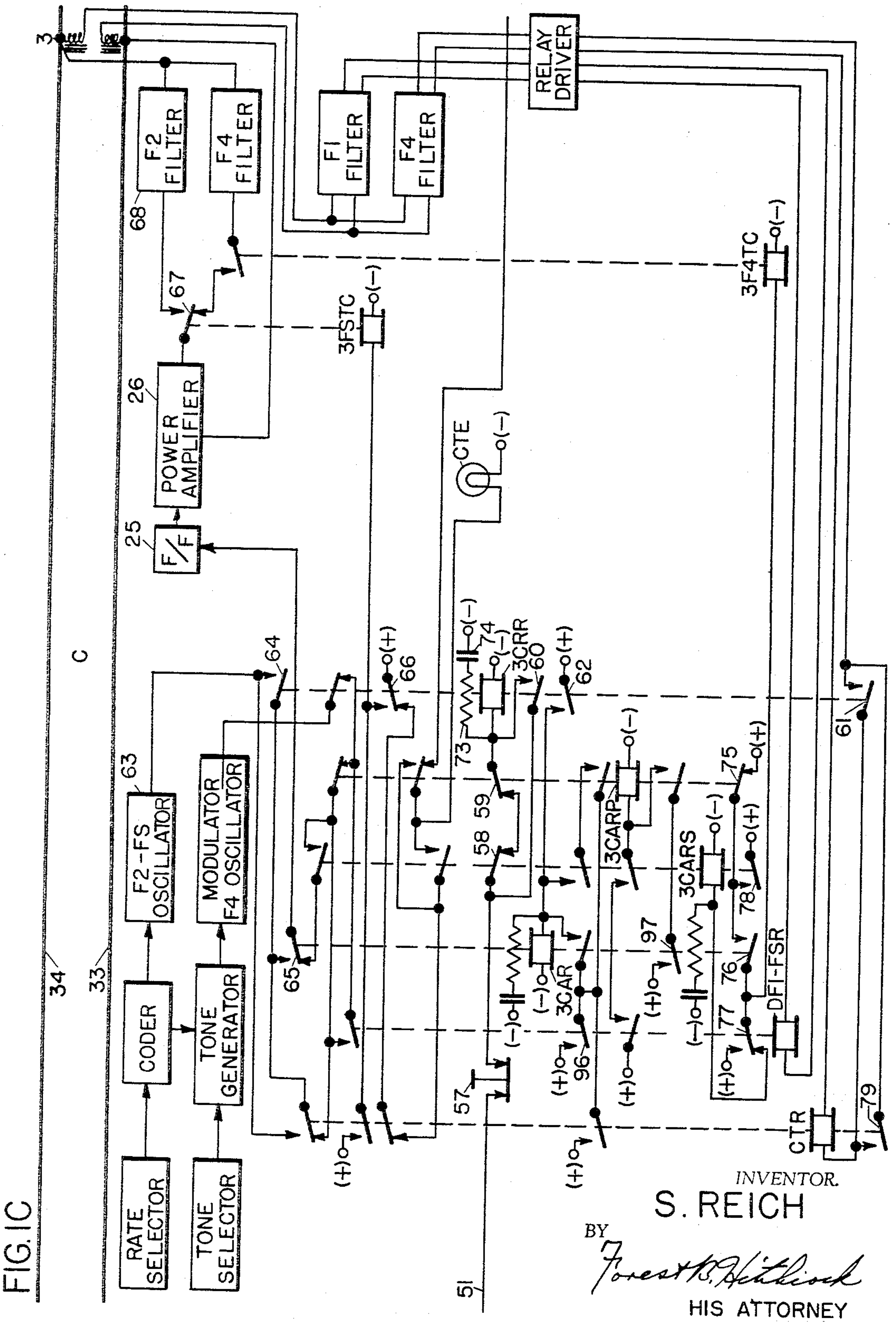

In describing the invention in detail, reference is made to the accompanying drawings in which corresponding letter reference characters are used to indicate the use of similar apparatus at different locations along the trackway; and in which:

FIGS. 1A, 1B and 1C when placed side-by-side illustrate one embodiment of the present invention as applied to the selective energization of typical feed locations along a stretch of continuous rail trackway;

FIGS. 2A through 2E illustrate conditions of track circuit energization under various traffic conditions; and FIGS. 3A through 3D illustrate the sequence of operation of relays in accordance with the movement of traffic under conditions illustrated in FIGS. 2B through 2E respectively.

Figure 2A:
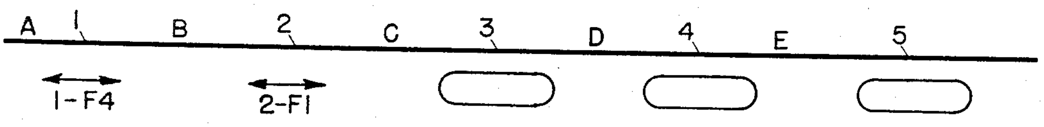
Figure 2B:
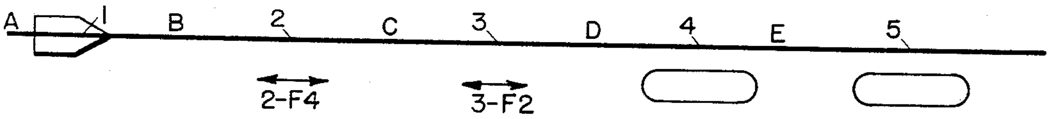

With reference to FIG. 2A, the system is illustrated as being applied to a stretch of continuous rail trackway divided into sections A, B, C, D and E and having feed points at locations 1, 2, 3, 4 and 5. The direction of traffic is from left to right, or for eastbound vehicles, and the stretch of track is normally deenergized except for the entering end to which energy is normally applied so that there is normally energy in the track rails at the entrance to the controlled territory when a vehicle such as the vehicle V of FIG. 1A enters the control area. Thus to prepare the system normally for the entrance of a vehicle into the section A, control energy at channel frequency F4, suitably modulated by coded control tones, is applied at the feed point 1. In addition, in order to prove that the section B is unoccupied, another coded channel frequency F1 is applied at the feed point 2 so that the energy at this frequency is transmitted through the track rails to a vehicle V entering the section A. There is no energy normally applied to the track rails at the feed point 3, or at other feed points along the stretch of track which are not within two feed locations of an approaching vehicle. High frequency energy is applied at these normally inactive feed points, one at a time, successively in accordance with the approach of a vehicle.

With reference to FIG. 1A, the transmitter for energization of the track rails at location 1 comprises an F4 Oscillator and Modulator 20 which is modulated in accordance with tones generated by a Tone Generator 21, such tones being selected by a suitable Tone Selector 22 which selects the tones for modulation of the channel frequency F4 in accordance with desired controls to be communicated from the wayside to an approaching vehicle. One manner in which the tones may be selected is for the Tone Generator 21 to generate seven tones and to select different combinations of two tones each for the transmission of information to an approaching vehicle. In order to check the integrity of the tones communicated to a vehicle, the tones generated by the Tone Generator 21 are coded by a suitable Coder 23 at a relatively low code rate, and at a rate selected by a Rate Selector 24. The rate can be selected, for example, in accordance with the direction of traffic. The rate of coding is preferably at a relatively low rate, such as at 120 pulses per minute for one direction of traffic and at 180 pulses per minute for the opposite direction of traffic. A coded and modulated channel frequency F4 signal is applied as an input to a flip-flop circuit 25 and an output of the flip-flop circuit 25 is applied to a Power Amplifier 26, which in turn furnishes an output connected across the track rails at location 1 through a suitable F4 Filter 27. The F4 Filter 27 is a band pass filter tuned to the channel frequency F4 so that the transmitter at location 1 will offer relatively high impedance across the track rails except for the channel frequency F4. This is particularly desirable so that the transmitter at location 1 will not heavily load the track circuit for the channel frequency F1, which is transmitted from location 2, and must be received on a vehicle in the section A, such as on vehicle V of FIG. 1A. The flip-flop circuit 25 at each location is effectively a frequency divider, and thus the frequencies generated for transmission must be twice the frequencies desired to be applied to the track rails. For example, if frequency F4 is to be a 5 kc. signal when applied to the track rails, the signal generated must be at 10 kc.

In accordance with the channel F4 frequency transmitted at location 1, the track relay BTR at location 2 is maintained in its picked up position under normal conditions. This relay is normally energized through its Stick Contact 28 by output of a Relay Driver 29 over wires 29*a* and 29*b* in accordance with its input applied to wires 30*a* and 30*b* through a F4 Filter 30 and through induction coils 31 and 32 from track rails 33 and 34 respectively. The induction coils 31 and 32 are disposed along the side of the respective track rails 33 and 34 at location 2, and these coils are so connected that any voltage induced in the coils because of current flowing through the associated track rails is added to the interrail potential at that location. Because of these coils, the potential of the receivers at each location is maintained substantially constant upon the approach of a vehicle to the associated location until the vehicle passes that location.

Details of a frequency shift oscillator, such as F1–FS oscillator 35, are well konwn in the art and are disclosed, for example, in handbood No. 83, Type FSK Frequency Shift Keyed Carrier Systems, copyrighted 1964 by the General Signal Corporation, Rochester, N.Y. In the system described on page 7 of this handbook, the frequency is shifted by selectively switching in and out small capacitors across the oscillator tank circuit. The shift in frequency from a channel frequency of 2 kc., for example, can be plus or minus 30 cycles for high and low shift frequencies respectively. Thus channel frequency F1, as applied to the track rails is a frequency shifted alternately within relatively small band width limits, and frequency F2 is another channel frequency shifted alternately by coding within relatively small band width limits by shifting alternately to high and low shift frequencies F2–FS oscillator 63.

At each of the other track feed locations, apparatus is provided as has been described for location 1, and in addition, apparatus is provided for at times transmitting a channel frequency F1 or a channel frequency F2. Location 2, for example, has apparatus for transmitting channel frequency F1, and location 3 has apparatus for transmitting channel frequency F2. Similarly, channel frequencies F1 and F2 can be transmitted from alternate locations throughout the stretch of track.

With reference to FIG. 1B, location 2 has transmitting apparatus for selectively applying a frequency F1 or frequency F4 to the track rails. The apparatus for transmitting at the channel frequency F4 is similar to that which has been described for the transmission of this frequency at location 1. In addition to the apparatus for the transmission of channel frequency F4, an F1–FS Oscillator 35 is provided at location 2 for transmission of a channel frequency F1. This oscillator is controlled by Coder 23 at that location to provide an output signal that is alternately at high and low shift frequencies relative to a center frequency, in accordance with the rate of operation of Coder 23 for location 2. Either channel frequency F1 or channel frequency F4 can be applied as an input to the flip-flop 25 at location 2 in accordance with circuit logic which will be hereinafter considered more in detail when considering the mode of operation of the system. When the channel frequency F1 is selected for transmission, the output of Power Amplifier 26 at location 2 is connected to the track rails 33 and 34 through an F1 Filter 26 which is a bypass filter for channel frequency F1 so that the transmitter is effectively a high impedance across the track rails except for the channel frequency F1.

Receiving apparatus is provided at location 1 for receiving channel frequency F1 transmitted through the track rails of Section B. This receiving apparatus comprises a Relay Driver 37 for energization of a track relay BF1–FSR, the relay driver having its input connected across the track rails 33 and 34 at location 1 through an F1 Filter 38 and through induction coils 39 and 40.

Each location, other than the location 1, has a channel request relay CRR, a channel application relay CAR, a channel application stick relay CARS and a channel application repeater relay CARP is provided at each location other than location 1, such as the relays 2CRR, 2CAR, 2CARS and 2CARP (see FIG. 1B) that are provided for location 2. Relays FSTC and F4TC are also provided at each location, except location 1, such as the relays 2FSTC and 2F4TC of FIG. 1B which are provided for location 2. These relays are used in the selection of the tuning of the output circuit of the transmitter at the associated location.

Having thus described the general organization of one embodiment of the present invention, further description will next be set forth as to the circuit logic involved upon passage of a train.

*Operation*

With reference to FIGS. 1A, 1B and 1C, the system is illustrated as being in its normal condition, which is the condition that the system assumes with no vehicles present on the trackway. Although a vehicle V is illustrated in FIG. 1A as being on the trackway, it has not yet reached the point to change the normal conditions of the system as they exist with no vehicle present. Thus a modulated and coded F4 signal is transmitted through the track rails at the location 1 as has been heretofore described, and this energy is received by suitable receiving apparatus on the vehicle V, and used to control the operation of the vehicle in accordance with the requirements of practice. This energy also feeds through the section B to maintain the track relay BTR energized at location 2 in a manner which has already been described.

In accordance with the relay BTR being normally maintained in its picked up position, the channel application relay 2CAR is also maintained in its picked up position by a stick circuit including front contact 41 of relay BTR and front contact 42 of relay 2CAR. Relay 2CARS is also maintained in its picked up position by a stick circuit including front contact 43 of relay 2CARS and back contact 44 of relay CF2–FSR. The closure of front contact 43 of relay 2CARS also maintains relay 2F4TC energized. Relay 2FSTC is maintained energized in accordance with the closure of front contact 45 of relay BTR. The closure of front contact 46 of relay 2FSTC connects the output of Power Amplifier 26 at location 2 to the track rails through the F1 Filter 36.

The input of the flip-flop circuit 25 at location 2 is selected to be governed by the F1–FS Oscillator 35 in accordance with the closure of a circuit including front contact 47 of relay BTR and front contact 48 of relay 2CAR. Thus, the frequency F1 is normally applied at location 2, and in accordance with energy of this frequency feeding through the track section B, the relay BF1–FSR is normally energized through Relay Driver 37 and F1 Filter 38 and through the induction coils 39 and 40 from the track rails at location 1.

Although the apparatus and circuits of FIG. 1C which are provided for location 3 are readily identified as corresponding to the circuit of FIG. 1B which are provided for location 2, it will be noted that no relays are energized under normal conditions in the apparatus provided for location 3, and this is to be understood as being a typical condition for all of the other locations to the right, or east of the location 3. Thus, there is no energy applied to the track rails at location 3, for example, because there is no input to the flip-flop circuit 25 at that location.

To consider the first step in the mode of operation upon the passage of a vehicle, it will be assumed that the vehicle V advances to a point where the track feed at location 1 becomes shunted. This causes the dropping away of the track relay BTR at location 2. The dropping away of relay BTR at location 2 disconnects the F1–FS Oscillator 35 from the input to the flip-flop circuit 25 at that location and connects the output of the Modulator and F4 Oscillator 20 through back contact 49 of relay 2CRR, back contact 50 of relay 2CARP, back contact 47 of relay BTR and front contact 48 of relay 2CAR to the input to flip-flop circuit 25. This provides modulated and coded energy at channel frequency F4 in the section B for control of the vehicle.

The dropping of track relay BTR also closes a circuit over line wire 51 for the energization of the channel request relay 3CRR for location 3. The circuit for the energization of relay 3CRR includes back contact 52 of relay 2CRR, back contact 53 of relay BTR, front contact 54 of relay 2CARS, back contact 55 of relay 2CARP, wire 51, normally closed contact 56 of push button 57, back contact 58 of relay 3CARS and back contact 59 of relay 3CARP. The picking up of relay 3CRR establishes a stick circuit at front contact 60 to shunt back contacts 58 and 59 of relays 3CARS and 3CARP respectively out of the circuit just described. The picking up of relay 3CRR causes the picking up of the track relay CTR for location 3 in accordance with the closure of front contact 61 of relay 3CRR, the relay CTR being energized by the F4 frequency energy applied to the track rails at location 2. The picking up of relay 3CRR also causes the picking up of relay 3CAR by the closure of front contact 62, and the picking up of relay 3CAR applies energy from the F2–FS Oscillator 63 through front contact 64 of relay 3CRR and front contact 65 of relay 3CAR to the input of flip-flop circuit 25 for location 3. Relay 3FSTC is picked up in accordance with the closure of front contact 66 of relay 3CRR, and the closure of front contact 67 of relay 3FSTC closes a circuit to connect the output circuit of the Power Amplifier 26 at location 3 through F2 Filter 68 to the track rails. Thus, the frequency F2 is applied at location 3, and this energy feeding through the track rails of section C causes the energization of relay CF2–FSR at location 2 through a suitable filter F2 and relay driver 29 similar to the mode of operation that has been described for energization for relay BF1–FSR at location 1.

The picking of relay CF2–FSR at location 2 causes the picking up of relay 2CARP by the energization of a circuit including front contact 69 of relay CF2–FSR and front contact 70 of relay 2CARS. A stick circuit is established for relay 2CARP including front contact 71 of relay 2CAR and front contact 72 of relay 2CARP. The picking up of relay CF2–FSR opens the stick circuit for relay 2CARS at back contact 44, and thus the relay 2CARS becomes dropped away. The relay 2CARP remains energized, however, because of its stick circuit. The picking up of relay 2CARP at location 2 opens the circuit for the control of the channel request relay 3CRR at location 3 by the opening of back contact 55, and thus the relay 3CRR becomes dropped away. This relay is made slow to drop away because of its winding being shunted through resistor 73 and capacitor 74 connected in series. From the mode of operation that has just been described, it will be readily apparent that the starting of transmission at location 3 of frequency F2 is dependent upon the dropping away of the track relay BTR at location 2 in accordance with the shunting of the track feed at location 1. There is no further propagation of track circuit starts at this time because no further propagation can be rendered effective until the track feed at location 2 is shunted by the eastbound vehicle V.

Figure 3A:
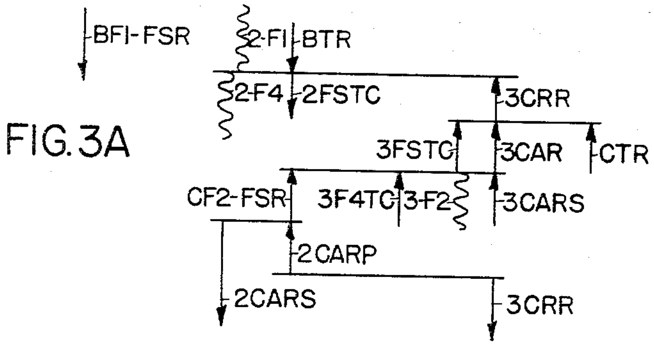

It will be noted, according to the sequence chart of FIG. 3A, that the picking up of relay 3CAR at location 3 causes the picking up of relays 3CARS and 3F4TC. Relay 3CARS is picked up by a circuit including back contact 75 of relay 3CARP, front contact 76 of relay 3CAR and back contact 77 of relay DF1–FSR. The closure of front contact 78 of relay 3CARS establishes a stick circuit to shunt contacts 75 out of the circuit just described. Relay 3F4TC is picked up by circuit including back contact 75 of relay 3CARP and front contact 76 of relay 3CAR. This relay is also energized after relay 3CARS has become picked up through front contact 78 of relay 3CARS.

Figure 2C:
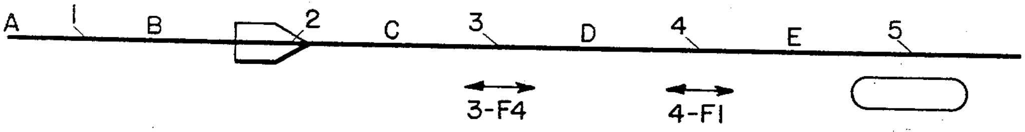
Figure 3B:
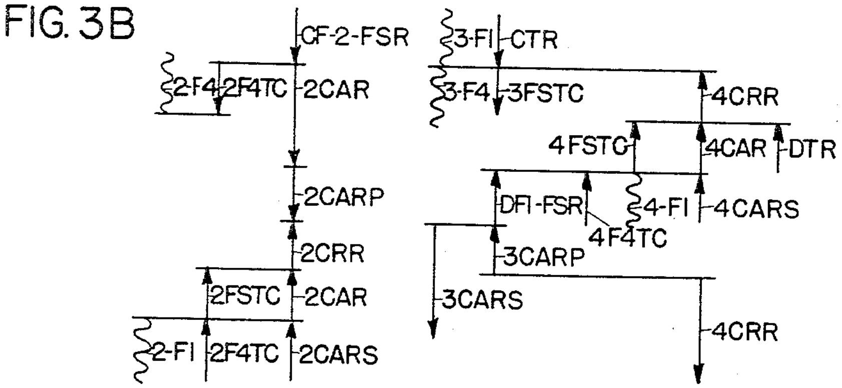

When the eastbound train proceeds further to the point of shunting the track feed at location 2 as is illustrated in FIG. 2C, a mode of operation for the extension of a request for channel transmission to another section in advance is rendered effective and is executed according to a sequence of relay operations as is illustrated by the sequence chart in FIG. 3B. This sequence of operations is initiated by the dropping away of relay CTR at location 3 in accordance with the shunting of section C. Relay 3CTR has been maintained energized up until this time by energy of F4 frequency feeding through the track rails of section C, relay CTR being maintained energized after the relay 3CRR has become dropped away in accordance with a stick circuit closed at front contact 79.

At location 2, the mode of operation is somewhat different than the other locations upon the passage of a train in that the shunting of the track feed at that location, by dropping the relay CF2–FSR, sets up a situation by which the channel request relay 2CRR is again energized to cause the application of high frequency energy to the section B in the rear of the vehicle. This is in accordance with the normal conditions that have been described wherein high frequency energy is normally transmitted in the section B because it is adjoining the entering end of the stretch of track for which the system is provided. The opening of front contact 80 of relay CF2–FSR removes the F4 channel from the track at location 2. This channel has been applied because of a circuit including back contact 49 of relay 2CCR, front contact 80 of relay CF2–FSR, back contact 47 of relay BTR and front contact 48 of relay 2CAR. Relay 2CAR becomes dropped away because of the opening of its stick circuit at front contact 81 of relay CF2–FSR, this contact being connected in multiple with front contact 41 of relay BTR, and being used to maintain the relay 2CAR energized after the track section B has become occupied by the vehicle. The dropping away of relay 2CAR causes the dropping away of relay 2CARP by opening its stick circuit at front contact 71. When relay 2CARP becomes dropped away, a circuit is established for the picking up of the channel request relay 2CRR over line wire 82 extending to location 1. This circuit includes back contact 83 of relay BF1–FSR, wire 82, normally closed contact 84 of push button 85, back contact 86 of relay 2CARS and back contact 87 of relay 2CARP. The picking up of this relay establishes a stick circuit at front contact 88 to shunt contacts 86 and 87 out of the circuit just described. The closure of front contact 89 of relay 2CRR causes the picking up of channel application relay 2CAR to cause application of channel energy of the frequency F1 to the track rails at location 2. Relay 2FSTC is picked up at this time by the closure of front contact 52 of relay 2CRR. The input to the flip-flop circuit 25 at location 2 is connected to the F1–FS Oscillator 35 at this time through front contact 90 of relay 2CRR and through front contact 48 of relay 2CAR. Relay 2CARS is restored to its normally picked up position by the energization of a circuit including back contact 91 of relay 2CARP, front contact 92 of relay 2CAR and back contact 44 of relay CF2–FSR. This relay, together with relays 2CAR, 2FSTC and 2F4TC are maintained picked up by the energization of circuits which have been described when considering the normal conditions of the system.

Figure 2D:
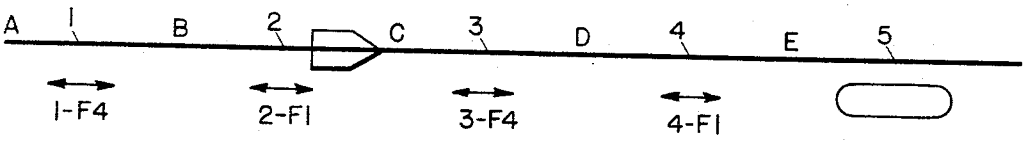
Figure 3C:
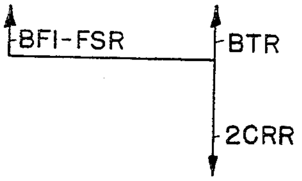

It will be assumed that the vehicle proceeds to a point where the section B becomes unoccupied in the rear of the vehicle as is illustrated in the track diagram of FIG. 2D. At this time the sequence of operation of relays becomes effective as is shown in the sequence chart of FIG. 3C. As is illustrated in FIG. 3C, the relay BF1–FSR becomes picked up at location 1, and the track relay BTR at location 2 becomes picked up in accordance with the energization of its pick up circuit including front contact 93 of relay 2CRR. The picking up of this relay establishes a stick circuit through its front contact 28 to maintain the relay BTR energized after the relay 2CRR becomes dropped away. The relay 2CRR becomes deenergized in accordance with the opening of its circuit at back contact 83 of relay BF1–FSR at location 1, and relay 2CRR becomes dropped away. Relay 2CRR is made slow to drop away by a shunt applied to its winding through resistor 94 in series with capacitor 95. This relay is made slow to drop away to insure the establishment of the stick circuit for the track relay BTR before relay 2CRR is dropped away.

Figure 2E:
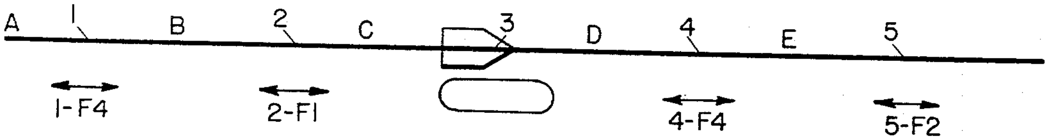
Figure 3D:
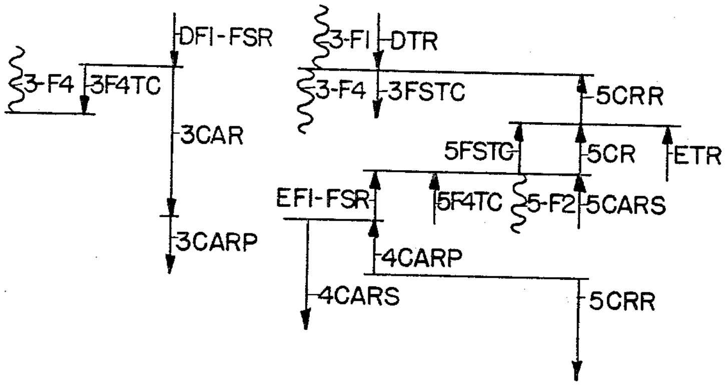

To consider further operation of the system wherein the apparatus for location 3 becomes completely restored to its normal condition, it will be assumed that the eastbound vehicle V advances to a point where it shunts the track rails at location 3 as is illustrated in the track diagram of FIG. 2E. A sequence of operations in accordance with such vehicle movement is effective as is illustrated in FIG. 3D.

It will be readily apparent that the mode of operation upon the shunt being applied at location 3 is comparable to the mode of operation which has been described in detail as being effective upon application of the shunt at location 2, and thus it is considered unnecessary to describe in detail the mode of operation under these conditions. There is a slightly different mode of operation, however, in the apparatus provided for location 3 because the transmitter for location 3 does not energize the track rails after passage of the vehicle as compared to the mode of operation that has been described for location 2. The mode of operation at location 2 for transmitting after passage of a vehicle is in accordance with the location 2 being adjacent the entering end of the territory, and thus the situation is peculiar to that location, and is not typical of the other locations in the system.

It will be noted that the shunting of the track rails at location 3 causes the dropping away of the relay DF1–FSR, and the dropping away of this relay causes the dropping away of relay 3F4TC by opening a circuit for that relay at front contact 77. The dropping away of relay DF1–FSR also causes the dropping away of relay 3CAR by opening its circuit at front contact 96, and the dropping away of relay 3CAR causes the dropping away of relay 3CARP by opening its stick circuit at front contact 97. This completes the restoration to the normally deenergized positions for all of the relays for location 3, and they remain in this condition until they are approach controlled by the approach of another vehicle.

Having described a complete cycle of operation of the wayside apparatus associated with the locations 1, 2 and 3, it is believed that the mode of operation under other traffic conditions, and upon further progress of a vehicle will be readily apparent from the description as it has been set forth.

Inasmuch as apparatus which can be provided on a vehicle for receiving the track circuit energy is well known in the art, it is believed to be unnecessary to describe such receiving apparatus in detail for an understanding of the mode of operation according to the present invention. With reference to FIG. 1A, it is to be understood that the vehicle V can be equipped with receiving coils 98 and 99 disposed over the running rails 33 and 34 respectively and ahead of the first axle which have induced therein continuous signals characteristic of the signals transmitted through the track rails. These signals are applied to automatic train operating apparatus 100 on the vehicle for the control of the throttle and brakes of the vehicle. More specifically, the energy received by the receiver coils 98 and 99 can be applied as inputs to a plurality of channel frequency filters, one of such filters being provided for each of the channel frequencies employed. The output of the filters can be used to energize respective relays indicative of the reception of the associated channel frequencies, and the output of the frequency filter for the frequency F4 can be applied to apparatus for detecting tone modulations on this channel frequency. This apparatus can provide for the selective energization of relays, for example, in accordance with the tones received. These receiving relays, together with means for checking the integrity of the signals received in accordance with their being coded, and together with means for monitoring the speed of the vehicle, are used in a comparator circuit logic organization to control the throttle and brakes of the vehicle or to control cab signaling apparatus if the vehicle is to be manually controlled. Receiving apparatus for providing the above mode of operation is disclosed in the Wilcox Patent No. 3,284,627, issued Nov. 8, 1966, and assigned to the same assignee as the present invention.

Having thus described one embodiment of the present invention as applied to high frequency track circuits for railroads, it is desired to be understood that this form has been chosen to facilitate the disclosure of the present invention relative to the principles involved rather than to limit the number of forms that the present invention may assume, and it is to be further understood that various adaptations, alterations and modifications may be applied to the specific form shown in accordance with the requirements of practice.

What I claim is:

1. A system of track circuits for a stretch of track having continuous rail which is subject to energization at a plurality of spaced locations comprising, a plurality of oscillators for each location for generating respective distinctive channel frequency signals, a flip-flop circuit for each location having its input controlled by a selected one of said channel frequency signals for applying an output signal to the track rails for energization thereof at a frequency related to the frequency signal selected for application to its input, and means for each location controlled by vehicle traffic in said stretch of track for selecting different ones of said channel signals respectively for an input to said flip-flop circuit means in accordance with traffic conditions.

2. The system according to claim 1 wherein a tone generator is provided for each of the locations for generating a selected combination of tone signals and modulating means is provided for modulating one of said channel frequency signals in accordance with the selected tones of the tone generator.

3. The system according to claim 2 wherein continuous coding means is provided for each location operable at a relatively low frequency as compared to the frequency of said channel frequency signals for coding each channel signal that is applied as an input to the flip-flop circuit at a selected rate.

4. The system according to claim 3 wherein said coding means is used to code the selected tone signals generated by said tone generator before they are used to modulate said one channel frequency as a means for coding said one channel frequency.

5. The system according to claim 3 wherein said coding means is used to shift the frequency of one of the oscillators to alternating higher and lower frequencies at a rate governed by the frequency of the coding means.

6. A system of track circuits for a stretch of track having a continuous track rails which is subject to energization at a plurality of spaced locations, a plurality of oscillators for each location for generating respective distinctive channel frequency signals, a band pass filter for each oscillator tuned to a frequency related to the frequency of the frequency signal of the associated oscillator for use in selectively governing the impedance loading of the track rails at the associated location, means for selectively applying energy to the track rails at a frequency related to the frequency of a selected one of said oscillators through the band pass filter for the oscillator that is selected, and means governed by the passage of a vehicle along the track for selecting one or the other of said channel frequency signals and its associated filter for each location for governing the energization of the track rails in accordance with the distance of the vehicle in approach of the associated location.

7. The system according to claim 6 wherein flip-flop circuit means is provided at each location and the channel frequency signals are selectively applied as an input to the flip-flop circuit means for driving the flip-flop at a frequency in accordance with the signal applied as an input and an output signal of the flip-flop circuit means is applied through said selected filter to the track rails.

8. A system of track circuits for a stretch of track having continuous rail in which there are track circuit feed points at spaced locations comprising, a plurality of oscillators for each location for generating respective distinctive channel frequency signals, normally inactive track circuit energizing means for each location operable when rendered active for energizing the track rails at the associated location at a frequency governed by a selected one of said channel frequency signals, means governed by the approach of a vehicle on said stretch of track to each location for rendering said track circuit energization means active for a predetermined number of locations in advance of the vehicle and for rendering a track circuit means for another location active each time the vehicle passes a location, and means for each location governed by the passage of the vehicle for selecting one or another of said channel frequency signals to govern said track circuit energization means in accordance with whether or not there is another location between the associated location and the approaching vehicle.

References Cited

UNITED STATES PATENTS 3,045,112 7/1962 Hailes ---------------- 246—63

FOREIGN PATENTS 1,107,696 5/1961 Germany.
814,681 6/1959 Great Britain.

OTHER REFERENCES

AFO, Staples, Railway Signaling and Communications, September 1964 (Simmons-Boardman, New York), pp. 20–26 and 52, copy in 246–34 (ct.).

ARTHUR L. LA POINT, *Primary Examiner.*

S. B. GREEN, *Assistant Examiner.*